Feb. 10, 1925.

N. A. CHRISTENSEN

AIR DRIER FOR BRAKE SYSTEMS

Filed April 19, 1924

1,526,119

INVENTOR.

NIELS A. CHRISTENSEN

BY Quarles & French

ATTORNEYS.

Patented Feb. 10, 1925.

1,526,119

UNITED STATES PATENT OFFICE.

NIELS A. CHRISTENSEN, OF MILWAUKEE, WISCONSIN.

AIR DRIER FOR BRAKE SYSTEMS.

Application filed April 19, 1924. Serial No. 707,707.

*To all whom it may concern:*

Be it known that I, NIELS A. CHRISTENSEN, a citizen of the United States of America, and resident of Milwaukee, in the county of Milwaukee and State of Wisconsin, have invented new and useful Improvements in Air Driers for Brake Systems, of which the following is a description, reference being had to the accompanying drawings, which are a part of this specification.

The invention relates to air brake equipment for automotive vehicles, and more particularly to a means for conditioning the air furnished to the compressor.

In the use of air brake equipment for furnishing compressed air to the brake-cylinders, and in which control valve mechanism is used to control the passage of air to said cylinders, it has been found that on very cold days there is a tendency for the moisture in the air upon condensing and freezing to impede the proper action of the valve mechanism. The present invention is designed to overcome this difficulty in a very simple and effective manner by drying the air from the heat of the engine's exhaust without decreasing the volumetric efficiency of the compressor.

The invention further consists in the several features hereinafter set forth and more particularly defined by claims at the conclusion hereof.

Figure 1:
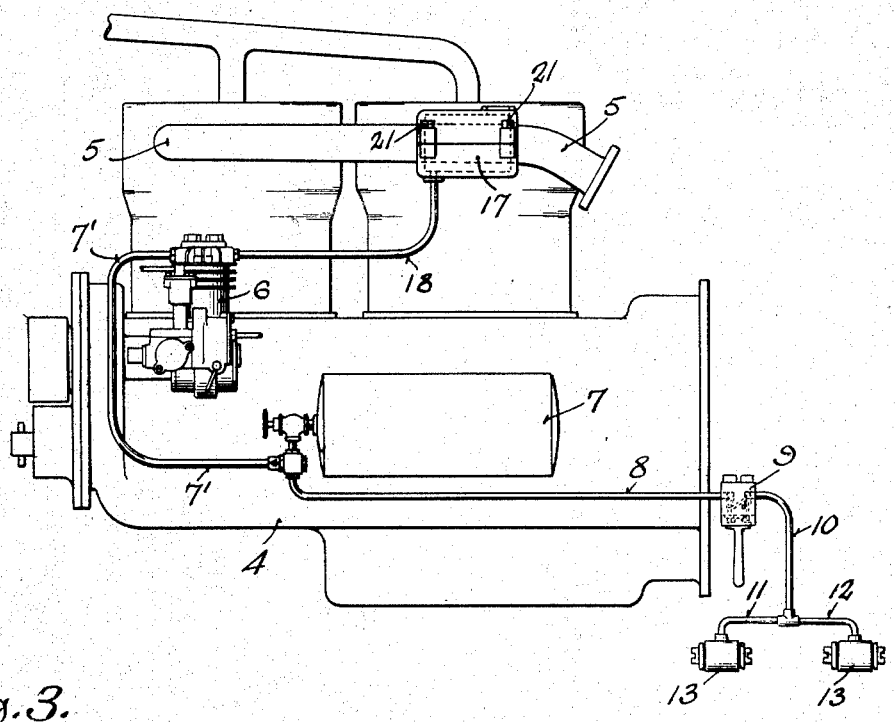
Figure 3:
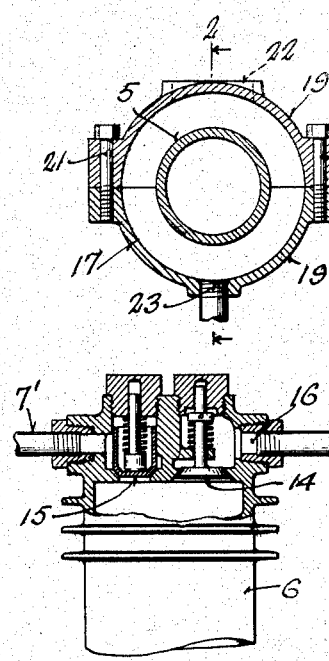
Figure 2:
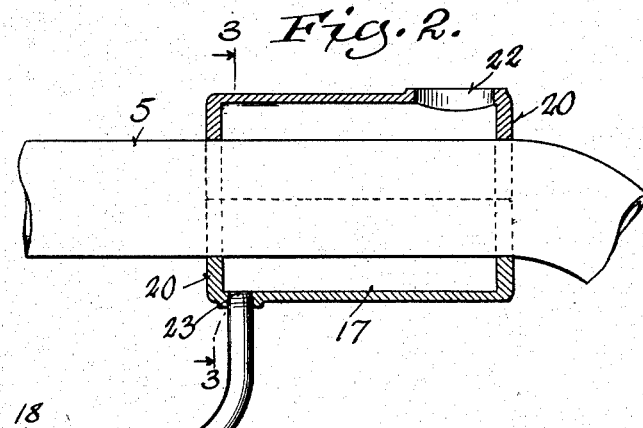

In the drawings: Fig. 1 is an elevation view of apparatus embodying the invention; Fig. 2 is a vertical sectional view of the air heater taken on the line 2—2 of Fig. 3;

Fig. 3 is a sectional view through the heater taken on the line 3—3 of Fig. 2, and also showing the head end of the compressor in section.

In the drawings the numeral 4 designates the internal combustion engine of an automotive vehicle of any suitable form having an exhaust pipe 5 and an air compressor 6 driven by said engine for supplying air through pipe 7' to a supply tank or reservoir 7 from which it is taken as needed by the brake-system, such a system usually including a pipe 8 leading to a control valve 9 from which the air passes to pipe 10 and pipes 11 and 12 to the brake-cylinders 12. With such a system, on very cold days, should the moisture in the air condense and freeze on the valves or valve seats of the control valve mechanism, said mechanism would not function properly, and to overcome this I have provided a means for heating the air prior to its passage to the compressor.

In Fig. 3 the head end of the compressor is shown as provided with the usual automatic suction spring-closed inlet valve 14 and the spring-closed discharge valve 15 whereby air drawn into the compressor through the port 16, controlled by the inlet valve 14 during the downward or suction stroke of the piston of the compressor, is on its upward stroke delivered past the then open discharge valve 15 to the reservoir.

To condition the air entering the inlet port 16, I provide a heater 17 and a pipe 18 leading from the heater to the port 16.

The heater 17 consists of a casing surrounding the exhaust pipe 5 and preferably made of two complementary semi-cylindrical hollow sections 19 having end portions 20 fitting over said pipe, said sections being clamped together and to the pipe by bolts 21.

This casing has an inlet opening 22 adjacent one end on its top portion and an outlet opening 23 adjacent the opposite end in its bottom portion, which opening 23 is connected by the pipe 18 to the port 16. With this construction it will be noted that the air comes into direct contact with the hot exhaust pipe during its passage through the casing.

The area of the inlet opening 22 is preferably several times larger than that of the outlet opening 23, as for example three to six times larger so that the suction effect at said inlet does not interfere with passage of vapor therefrom and so that there is plenty of chance for aqueous vapors, contained in the air drawn into said casing by the suction of the compressor, rising and passing out through said inlet opening by reason of the heating so that the air passing to the opening 23 is freed of these vapors. Furthermore, the arrangement of these openings at the opposite ends of the casing also insures a thorough drying of the air and hence the lodging of moisture in any part of the compressed air or braking system is prevented.

Where the connection of the heater with the exhaust pipe is such that it is not feasible to take air direct through the plain exposed inlet, a pipe of suitable size and at least as large as said inlet may be connected thereto and lead up to a space where clean air can be obtained, as will be readily understood.

The heater is preferably located at such a distance away from the compressor, that is, the length of the inlet pipe 18 is such that the dry air from the heater is given a chance to cool before it reaches the compressor and hence the initial heating of the air will not impair the volumetric efficiency of the compressor.

I desire it to be understood that this invention is not to be limited to any particular form or arrangement of parts except in so far as such limitations are included in the claims.

I claim:

1. In an automotive vehicle, the combination with the internal combustion engine of said vehicle and a compressed air system for said vehicle including a compressor, of means for drying the air furnished to said compressor comprising an air heater, heated by the exhaust of said engine, and a connection between said heater and the inlet of the compressor.

2. In an automotive vehicle, the combination with the internal combustion engine of said vehicle and a compressed air system for said vehicle including a compressor, of means for drying the air furnished to said compressor comprising an air heater, heated by the exhaust of said engine, and piping between said heater and the inlet port of the compressor permitting cooling of the dry air on its way to the compressor to prevent substantial loss in the volumetric efficiency of said compressor.

3. In an automotive vehicle, the combination with the engine and the compressed air system therefor including a compressor, of means for drying the air furnished to said compressor including a casing heated by the exhaust heat of the engine and a connection between said heater and the inlet of the compressor, said casing having an inlet opening for atmospheric air and an outlet opening communicating with said compressor, the inlet opening to the heater being larger than its outlet opening to permit of the ready passage of aqueous vapor in the heated air through said inlet opening.

4. In an automotive vehicle, the combination with the internal combustion engine of said vehicle and a compressed air system for said vehicle including a compressor, of means for drying the air furnished to said compressor comprising an air heater, heated by the exhaust of said engine, and a connection between said heater and the inlet of the compressor, said heater having an inlet opening and an outlet opening arranged at opposite ends and on opposite sides thereof, said inlet opening being larger than the outlet opening.

5. In an automotive vehicle, the combination with the internal combustion engine of said vehicle and a compressed air system for said vehicle including a compressor, of means for drying the air furnished to said compressor comprising a hollow casing surrounding a portion of said exhaust pipe and having an inlet opening at its top adjacent one end and an outlet opening in its bottom adjacent its other end, said inlet opening being of greater area than said outlet opening, and a pipe connecting said outlet opening with the inlet of the compressor and of a length to permit cooling of the dry air to prevent loss in the volumetric efficiency of the compressor.

In testimony whereof I affix my signature.

NIELS A. CHRISTENSEN.